UNITED STATES PATENT OFFICE.

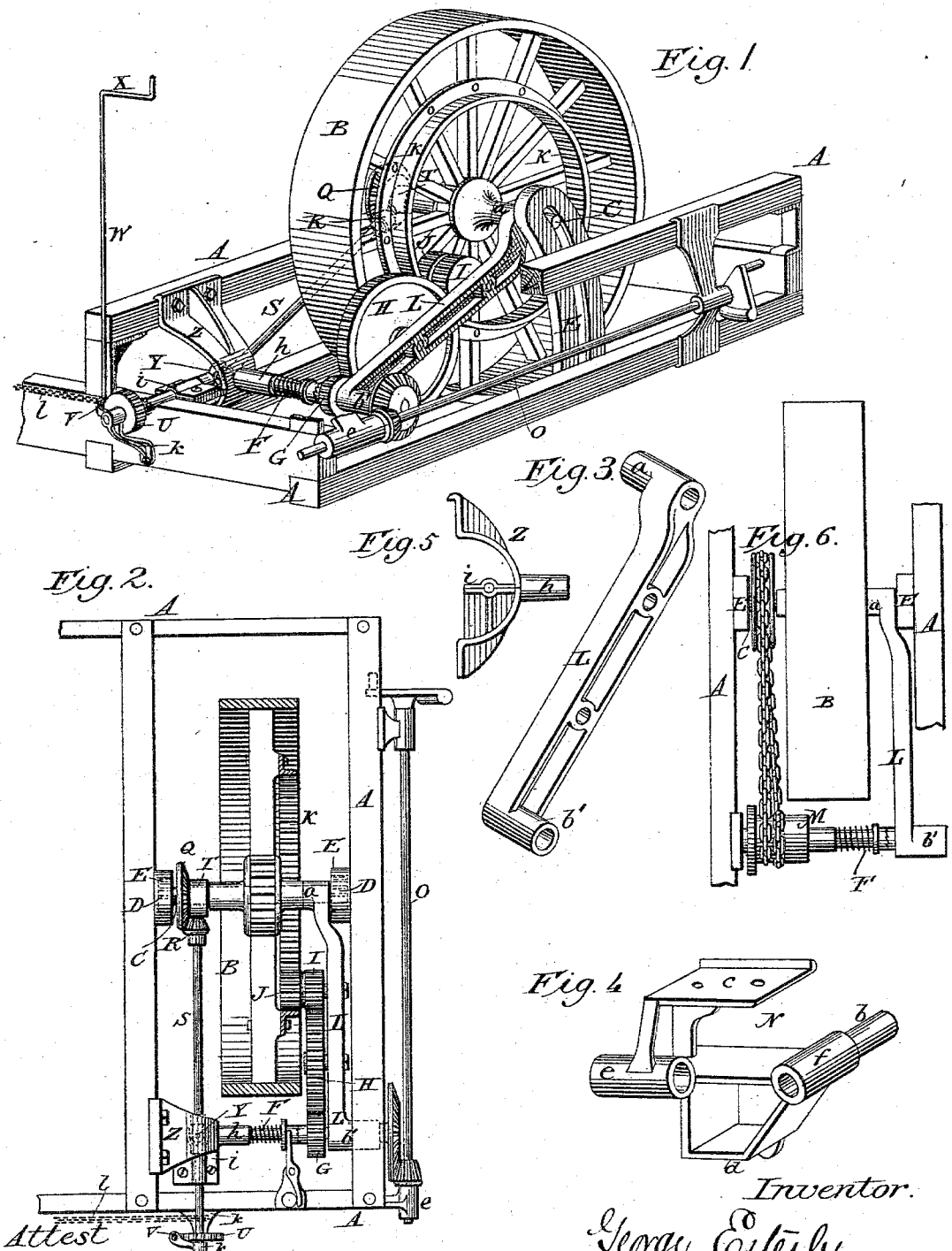

GEORGE ESTERLY, OF WHITEWATER, WISCONSIN.

GRAIN-HARVESTING MACHINE.

SPECIFICATION forming part of Letters Patent No. 288,784, dated November 20, 1883.

Application filed June 14, 1883. (No model.)

*To all whom it may concern:*

Be it known that I, GEORGE ESTERLY, of Whitewater, in the county of Walworth and State of Wisconsin, have invented certain Improvements in Grain-Harvesting Machines, of which the following is a specification.

This invention has reference to that class of grain-harvesting machines wherein the main frame is adjustable vertically with reference to the main or ground wheel, from which motion is transmitted to the operative mechanism of the harvester, and also to the binding mechanism when the latter is employed.

The aim of the invention is to provide means for effecting the vertical adjustment of the frame and for communicating motion from the main wheel to the gearing, which shall be simple in construction and adapted to be operated with a minimum amount of power, and free from liability to cramp or become deranged in consequence of the strains to which the various parts are subjected in the field.

To this end it consists, essentially, in combining with the main wheel an adjustable main frame and an intermediate arm or bar journaled at one end upon or around the main axle and at the opposite end around the gear-shaft upon the frame, this bar carrying intermediate wheels or pinions for communicating motion from the main wheel to the gear-shaft.

It further consists in the peculiar form and arrangement of the above parts, as hereinafter explained in detail.

It further consists in combining with the main frame, adjustable vertically in the arc of a circle to maintain the connection of the gearing, frame-adjusting devices arranged to swing around a center coincident with the axis of the gear-shaft, around which the frame swings when rising and falling.

It further consists in the peculiar arrangement of details in this regard, as hereinafter explained.

Referring to the accompanying drawings, Figure 1 is a perspective view of the main frame and wheel of a harvester and their connections, having my improvements embodied therein, portions of the frame being broken away to expose other parts to view. Fig. 2 is a top plan view of the same, the main wheel being shown in horizontal section. Fig. 3 is a perspective view of the swinging bar or arm on which the intermediate gear is mounted. Fig. 4 is a perspective view of the main box or bearing. Fig. 5 is a side view of the box or bearing employed to sustain the gear-shaft and adjusting devices. Fig. 6 is a view illustrating a modification of the apparatus.

Referring to the drawings, A represents the rectangular main frame, which may be of any ordinary or approved construction adapted to sustain the driving-gear at one end and the grain-platform at the other, as usual in harvesting machines of the present day.

B represents the main or ground wheel, mounted in one end of the main frame for the purpose of supporting the same and communicating motion to the gearing. The wheel B is mounted loosely upon a horizontal axis, C, its two ends being provided with spur-pinions D, secured firmly thereon and arranged to travel in vertical curved rack-plates E, which are bolted firmly to the main frame, so that by turning the axle and pinions the frame may be raised and lowered, as required. This arrangement of the axle, pinions, and rack-plates is a common one in the art, and forms no part of my invention.

Upon the rear side of the main frame, lengthwise thereof, and behind the main wheel, I mount a horizontal shaft, F, commonly known as the "gear-shaft," through which motion is transmitted in an ordinary manner to the operative parts of the harvesting-machine. This shaft receives motion through a spur-pinion secured thereon and driven by a gear-wheel, H, which in turn receives motion from a pinion, I, secured to or formed in one piece with a concentric pinion, J, which latter engages with the internal teeth of a geared rim, K, secured to the side of the main wheel. The gear-wheel H and the double pinion I J revolve upon journals secured to a supporting bar or arm, L, one end of which is journaled around or concentric with the gear-shaft F, while the opposite end loosely encircles the main axle C, this arrangement causing the bar to rise and fall in accordance with the adjustment of the main frame, and to maintain a constant relation between the various gears, so that the adjustment of the frame in no wise affects the operation of the driving-train.

It will be understood that in order to permit the frame to rise and fall freely and to prevent the cramping or binding of the parts the vertical curvature of the rack-plates E is to correspond with the path described by the forward end of the swinging arm L; or, in other words, that the rack-plates E will be curved in the arcs of circles described from the axis of the gear-shaft F as a center. By locating the gear-shaft in rear of the main wheel and at a great distance from the axis of said wheel, I am enabled to employ rack-plates E, having comparatively slight curvature in a vertical direction, so that the frame in its vertical adjustment is moved forward and backward with respect to the main wheel a slight distance as compared with the movement in those machines which have the rack-plates described from a center within the periphery of the main gear-wheel K, and which have, consequently, a much greater divergence from a vertical line than those represented in the drawings. My construction limits the forward and backward motion of the main frame with respect to the main wheel to the minimum extent. This limitation of the forward and backward movement is a feature of great importance, inasmuch as it prevents the balance or poise of the machine upon the main wheel from being destroyed by the vertical adjustment, as is the case in existing machines of the ordinary type.

The bar or arm L, upon which the intermediate gears are supported, is preferably constructed with that end which encircles the axle seated directly thereon, the end being widened to form a long hub or sleeve, as shown at $a$, Fig. 3, whereby it is given a long bearing upon the shaft and prevented from twisting or binding thereon. At its rear end the arm L may be journaled directly upon the main shaft F; but in order to relieve this shaft from the wear and friction which would follow such arrangement I prefer to mount the rear end of the arm on a hollow sleeve or journal, $b$, formed, as shown in Fig. 4, upon the box or bearing N, which sustains the shaft. This bearing N, the form of which is clearly represented in Fig. 4, is provided with an upper and lower surface, $c$ $d$, adapted to be bolted between and to assist in retaining in place the longitudinal timbers of the main frame. It is provided with a tubular bearing, $e$, to extend fore and aft of the frame and support the crank-shaft O, hereinafter mentioned. It is also provided at right angles with the bearing $e$ with a second tubular bearing, $f$, designed to sustain the end of the gear-shaft F. It is upon the side or end of this bearing $f$ that the hollow journal $b$, to support the bar L, is formed. This arrangement of the bar-supporting journal causes the latter to swing around the axis of the gear-shaft F. The rear end of the bar L is widened or extended, forming, as shown in the various figures, an elongated sleeve or bearing, $b'$, to receive the journal $b$. Owing to the fact that the bar L is given the long bearings at the two ends, it receives an exceedingly firm and rigid support, whereby it is prevented from cramping or binding or twisting out of position when in action, so that it is enabled to maintain the gears under all circumstances in the proper relative position, and this notwithstanding the fact that the main frame may become slightly changed or twisted when in action.

For the purpose of revolving the main axle to effect the vertical adjustment of the frame, it is provided, as shown in Fig. 2, with a bevel-gear, Q, engaging with and driven by a corresponding pinion, R. This pinion R is mounted on a longitudinal shaft, S, the forward end of which is seated in a collar or bearing, T, loosely encircling the main axle. The shaft S is extended backward to the rear end of the frame, and provided with a worm-wheel, U, actuated by means of a worm, V, applied to the lower end of a vertical shaft, W, the upper end of which is provided with a hand-crank or equivalent operating device, X, located in suitable position to be operated by the driver or attendant while occupying the ordinary seat upon the machine. In order to admit of the rear end of the shaft S rising and falling with the main frame, the shaft is divided and its two parts connected by a universal joint or coupling, Y, as shown in Figs. 1 and 2, this joint being located at a point coincident with the axis of the main gear-shaft F, around which, it will be remembered, the frame moves in rising and falling. By thus arranging the driving-shaft and the driving device of the adjusting mechanism in the same line, and arranging the main frame to swing around this line as it rises and falls, the various parts are permitted to retain their operative positions, and to act without cramping as the frame is adjusted.

The rear end of the shaft S and the inner end of the gear-shaft F are both sustained in boxes or bearings formed in a bracket, Z, of the form shown in Figs. 1, 2, and 5, this bracket being bolted at its upper and lower ends to the inner timbers of the main frame. As shown in Fig. 5, $h$ represents the sleeve or journal which receives the end of the gear-shaft, while $i$ represents the bearing for the adjuster-shaft. The adjuster-shaft S is preferably extended rearward beyond the main frame, and sustained by a bracket, $k$. Being thus extended, the chain $l$, by which the supporting-wheel at the grain side of the machine is operated, as usual, may be wound directly upon the shaft, as shown. When thus arranged, the shaft serves, it will be seen, to adjust both the main wheel and the chain for adjusting the grain-wheel.

In place of the geared jointed shaft for securing the elevation of the frame, I may substitute, if desired, an endless chain, passing around a sprocket-wheel on the axle and around a drum or pulley at the rear, as shown in Fig. 6. When these devices are employed, the rear drum, M, upon which the endless chain passes, will be provided with suitable operating and locking devices. It will be observed that in this arrangement, as in the preceding, the frame in rising and falling swings around an axis common to the gear-shaft and to the adjusting devices, so that both the gear and the adjusting devices remain unaffected by the vertical adjustment of the frame.

The present invention is restricted to those matters and things which are hereinafter claimed, and as to all matters which may be described or shown, but which are not claimed, the right is reserved to make the same the subject of a separate application.

Having thus described my invention, what I claim is—

1. In a grain-harvesting machine, the combination of the main wheel, the main frame adjustable vertically with respect to said wheel, the gear-shaft located upon the main frame in rear of said wheel, intermediate gearing connecting said shaft with the main wheel, and mechanism for effecting the vertical adjustment of the frame, arranged to swing about a point coincident with the axis of the gear-shaft.

2. In a harvesting-machine, the combination of the main wheel, the main frame adjustable vertically thereon, the gear-shaft located upon the main frame beyond the periphery of said wheel, intermediate gearing connecting the main wheel and gear-shaft, and an arm to support said intermediate gear, said arm being movable at one end about the axis of the gear-shaft and at the opposite end about the axis of the main wheel.

3. In a harvesting-machine, the combination of the main ground-wheel, a vertically-adjustable main frame supported thereby, a gear-shaft located upon the frame in rear of the main wheel, a bar or arm having its ends mounted, respectively, around the main axle and the gear-shaft, and the intermediate driving-gear located upon said bar and serving to transmit motion from the main wheel to the gear-shaft.

4. In combination with the main frame, the gear-shaft thereon, and the curved rack-plates concentric with said gear-shaft, the main wheel, its axle, and pinions, the bar L, mounted at one end upon the axle and at the opposite end around the gear-shaft, the internally-geared rim applied to the main wheel, the pinions I and J, mounted upon the bar L, the gear-wheel H, also mounted upon the bar, and the pinion G, secured to the gear-shaft.

5. The improved box or bearing N, constructed, substantially as shown, with the two bearings $e$ and $f$ at right angles to each other, and with a journal or projection, $b$, adapted to receive the gear-supporting arm.

6. In a harvester, the main or ground wheel and a main frame adapted to rise and fall thereon around the axis of a pinion located upon the main frame in rear of and beyond the periphery of the main wheel, a swinging bar or arm arranged to swing at its respective ends around the axis of the main wheel and the axis of the pinion, and intermediate gear mounted upon said arm, and serving to transmit motion from the main wheel to the pinion upon the frame, substantially as described.

7. The improved shaft support or bearing Z, constructed with the hub or sleeve $h$, and with a box or bearing, $i$, the latter arranged on the inside and at right angles to the former, substantially as described and shown.

GEORGE ESTERLY.

Witnesses:
W. C. DUVALL,
P. T. DODGE.